US012386889B2

(12) United States Patent
Lin et al.

(10) Patent No.: US 12,386,889 B2
(45) Date of Patent: Aug. 12, 2025

(54) GENERATING PERSONALIZED DIGITAL THUMBNAILS

(71) Applicant: International Business Machines Corporation, Armonk, NY (US)

(72) Inventors: Sheng-Hsiang Lin, New Taipei (TW); Tsai-Hsuan Hsieh, Taipei (TW); Chiwen Chang, Taipei (TW); Ching-Chun Liu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 17/678,077

(22) Filed: Feb. 23, 2022

(65) Prior Publication Data

US 2023/0267145 A1  Aug. 24, 2023

(51) Int. Cl.
 *G06F 16/683* (2019.01)
 *G06F 16/583* (2019.01)
 *G06F 16/64* (2019.01)
 *G06F 16/68* (2019.01)

(52) U.S. Cl.
 CPC .......... *G06F 16/685* (2019.01); *G06F 16/583* (2019.01); *G06F 16/64* (2019.01); *G06F 16/686* (2019.01)

(58) Field of Classification Search
 CPC ...... G06F 16/685; G06F 16/583; G06F 16/64; G06F 16/686; G06F 16/739
 See application file for complete search history.

(56) References Cited

U.S. PATENT DOCUMENTS

| 2011/0029540 A1* | 2/2011 | Ptucha | G06T 11/60 |
| | | | 707/E17.02 |
| 2011/0029914 A1* | 2/2011 | Whitby | G06T 11/60 |
| | | | 345/619 |
| 2016/0198239 A1 | 7/2016 | Shenkler | |
| 2019/0026563 A1* | 1/2019 | Pachauri | G06V 20/47 |
| 2020/0013380 A1* | 1/2020 | Kakoyiannis | G06F 16/61 |

(Continued)

FOREIGN PATENT DOCUMENTS

EP  3798866 A1 *  3/2021  ......... G06F 3/04845

OTHER PUBLICATIONS

"Dynamic Title Generation for Streaming Content", An IP.com Prior Art Database Technical Disclosure, Authors et. al.: Disclosed Anonymously, IP.com No. IPCOM000262505D, IP.com Electronic Publication Date: Jun. 8, 2020, 3 pages.

(Continued)

*Primary Examiner* — Yogeshkumar Patel
(74) *Attorney, Agent, or Firm* — Kelsey M. Skodje (57) ABSTRACT

A computer-implemented method for generating a custom thumbnail is disclosed. The computer-implemented method includes segmenting an audio file into one or more audio segments based, at least in part, on a respective context associated with each of the one or more audio segments. The computer-implemented method further includes selecting an initial thumbnail image based, at least in part, on one or more contexts associated with the one or more audio segments. The computer-implemented method further includes generating a customized thumbnail image based, at least in part, on performing a neural style transfer of the initial thumbnail image and a style reference image.

20 Claims, 7 Drawing Sheets

(56) References Cited

U.S. PATENT DOCUMENTS

2021/0011608 A1    1/2021  Srinivasan
2021/0166666 A1*   6/2021  Kakoyiannis ........ G10H 1/0008

OTHER PUBLICATIONS

Babaee et al., "On Flow Profile Image for Video Representation", arXiv:1905.04668v1 [cs.CV] May 12, 2019, 10 pages.

He et al. ,"Auto-summarization of audio-video presentations", Proceedings of the seventh ACM International conference on Multimedia (Part 1), Oct. 1999, pp. 489-498, <https:doi.org/10.1145/319463.319691>.

Mell et al., "The NIST Definition of Cloud Computing", Recommendations of the National Institute of Standards and Technology, NIST Special Publication 800-145, Sep. 2011, 7 pages.

* cited by examiner

GENERATING PERSONALIZED DIGITAL THUMBNAILS

BACKGROUND

The present invention relates generally to the field of digital thumbnails, and more particularly to, generating a unique digital thumbnail.

A digital thumbnail is a compressed preview image of the original that is used as a placeholder. Depending on the platform, a thumbnail image typically has a certain size, although there is no particular standard size of a thumbnail. In particular, digital thumbnails are used to depict pictures, music album covers, movie trailers, and streaming content, such as audio podcasts or video. Digital thumbnails tend to indicate or reflect the content of the audio, image, video, or multimedia the digital thumbnail represents. For example, a digital thumbnail for a song may include an image of the singer and the band name with music note graphics and a thumbnail for a podcast may include an image of the speaker with the topic of the podcast discussion.

SUMMARY

According to one embodiment of the present invention, a computer-implemented method for generating a custom thumbnail is disclosed. The computer-implemented method includes segmenting an audio file into one or more audio segments based, at least in part, on a respective context associated with each of the one or more audio segments. The computer-implemented method further includes selecting an initial thumbnail image based, at least in part, on one or more contexts associated with the one or more audio segments. The computer-implemented method further includes generating a customized thumbnail image based, at least in part, on performing a neural style transfer of the initial thumbnail image and a style reference image.

According to another embodiment of the present invention, a computer program product for generating a custom thumbnail is disclosed. The computer program product includes one or more computer readable storage media and program instructions stored on the one or more computer readable storage media. The program instructions include instructions to segment an audio file into one or more audio segments based, at least in part, on a respective context associated with each of the one or more audio segments. The program instructions further include instructions to select an initial thumbnail image based, at least in part, on one or more contexts associated with the one or more audio segments. The program instructions further include instructions to generate a customized thumbnail image based, at least in part, on performing a neural style transfer of the initial thumbnail image and a style reference image.

According to another embodiment of the present invention, a computer system for generating a custom thumbnail is disclosed. The computer system includes one or more computer processors, one or more computer readable storage media, and computer program instructions, the computer program instructions being stored on the one or more computer readable storage media for execution by the one or more computer processors. The program instructions include instructions to segment an audio file into one or more audio segments based, at least in part, on a respective context associated with each of the one or more audio segments. The program instructions further include instructions to select an initial thumbnail image based, at least in part, on one or more contexts associated with the one or more audio segments. The program instructions further include instructions to generate a customized thumbnail image based, at least in part, on performing a neural style transfer of the initial thumbnail image and a style reference image.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of digital thumbnails, and more particularly to, generating a unique digital thumbnail.

Digital thumbnails typically depict the content of the audio, image, video, or other multimedia the digital thumbnail represents. Digital thumbnails are usually selected by the producer, singer, speaker, or creator of the content the digital thumbnail represents. However, oftentimes, the digital thumbnail is vague or irrelevant and it is not clear to users what the topic of discussion, genre, band, artists, or movie the digital thumbnail represents. Sometimes, digital thumbnails are misleading and depict one thing, yet the content is related to a totally different area, topic, or genre. New podcasts, albums, movies, shows, and songs are released every day and with the vast amount of content available it has become increasingly difficult for listeners and viewers to find interesting and personalized content. Oftentimes, users may only be able to realize a podcast albums, movies, shows, or music is not of interest to them after wasting time of listening or viewing a large amount of the content.

Embodiments of the present invention generate a digital thumbnail based on a user's personal preferences and the content of the multimedia. User personal preferences comprise preference of relationship between emotions and colors. Embodiments of the present invention analyze both textual and non-textual features such as vocal and conversational properties of the multimedia. Embodiments of the present invention determine the vocal and conversational properties of the multimedia based on time. Embodiments of the present invention transform a thumbnail image based on user preference and vocal and conversational properties or summaries of the multimedia. For example, the present invention generates an initial thumbnail image and then performs neural style transfer to create a customized thumbnail based, at least in part, on the conversational properties or summaries of the multimedia. Neural style transfer is an optimization technique used to take two images such as a content image and a style reference image and blend them together to create an output image that looks like the content image, but "painted" in the style of the style reference image. Generating a customized thumbnail is advantageous to help users better determine the content of the multimedia before listening or viewing the multimedia. For example, a customized thumbnail for a podcast on antique cars in accordance with embodiments of the present invention may generate a customized thumbnail including an antique car to indicate the content of the multimedia to the user.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
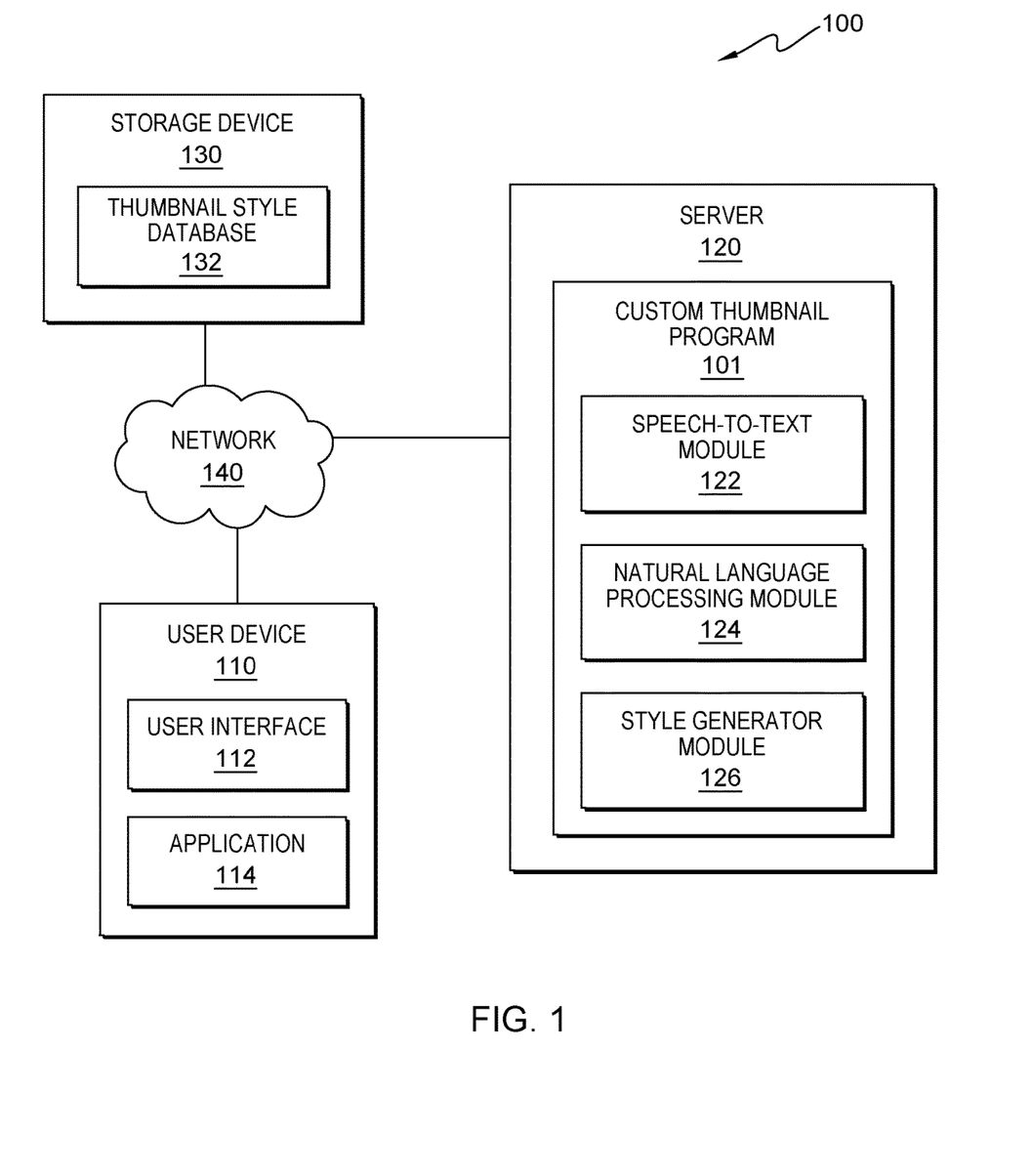
FIG. 1 is a block diagram of a network computing environment suitable for a custom thumbnail program 101, generally designated 100, in accordance with at least one embodiment of the present invention.

The present invention will now be described in detail with reference to the Figures. FIG. 1 is a functional block diagram of a network computing environment suitable for a custom thumbnail program 101, generally designated 100, in accordance with at least one embodiment of the present invention. In an embodiment, network computing environment 100 may be provided by cloud computing environment 50, as depicted and described with reference to FIG. 6, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 5.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays one or more thumbnails.

Application 114 can be representative of one or more applications (e.g., an application suite) that operate on user device 110. In an embodiment, application 114 is representative of one or more applications (e.g., podcast applications, multimedia applications, streaming applications, and social media applications) located on user device 110. In various example embodiments, application 114 can be an application that a user of user device 110 utilizes to stream digital media, such as image data, audio data (e.g., podcasts) or video data. In an embodiment, application 114 can be a client-side application associated with a server-side application running on server 120 (e.g., a client-side application associated with custom thumbnail program 101). In an embodiment, application 114 can operate to perform processing steps of custom thumbnail program 101 (i.e., application 114 can be representative of custom thumbnail program 101 operating on user device 110).

Server 120 is configured to provide resources to various computing devices, such as user device 110. For example, server 120 may host various resources, such as custom thumbnail program 101 that are accessed and utilized by a plurality of devices. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 5:
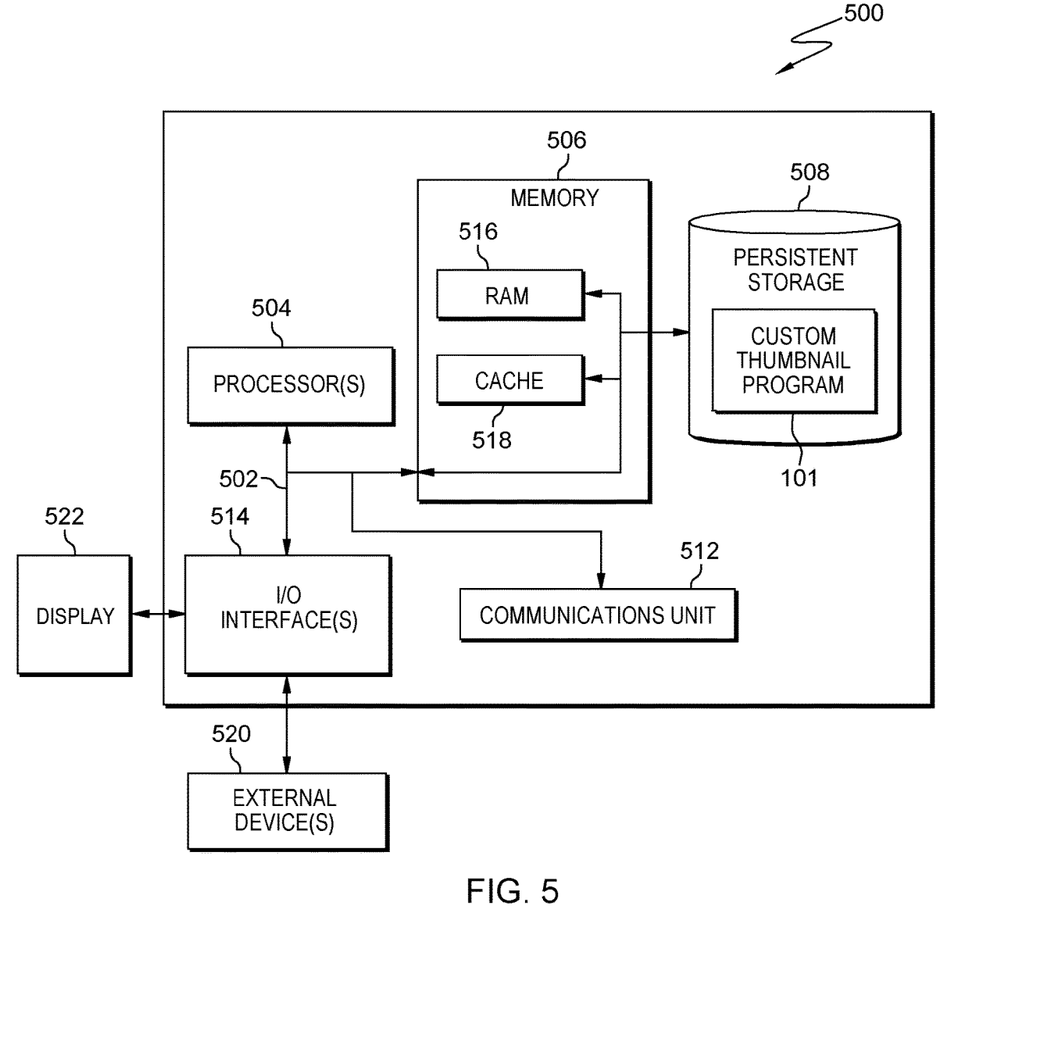
FIG. 5 is a block diagram depicting components of a computer, generally designated 500, suitable for executing a custom thumbnail program 101 in accordance with at least one embodiment of the present invention.
Figure 6:
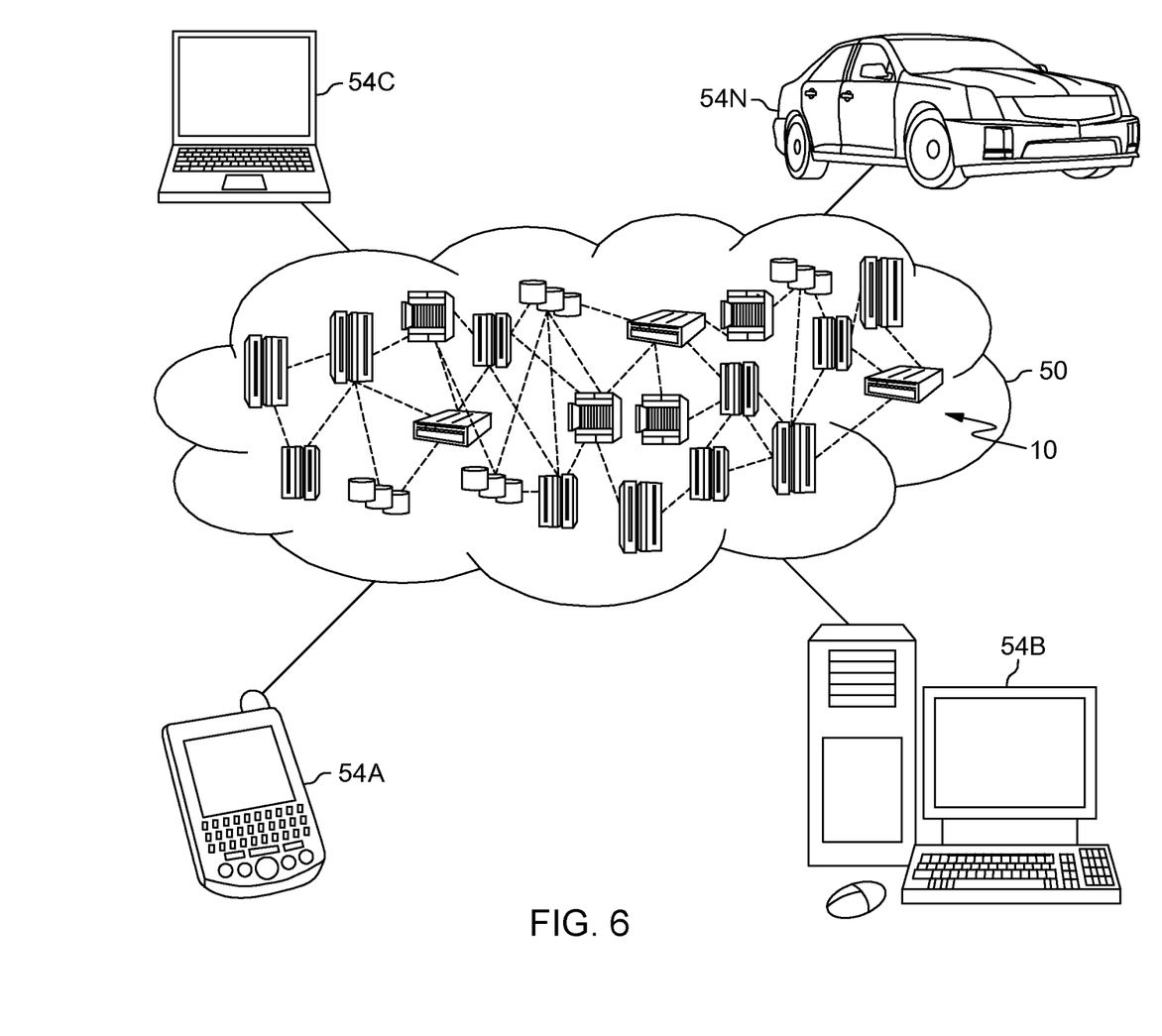
FIG. 6 is a block diagram depicting a cloud computing environment 50 in accordance with at least one embodiment of the present invention.

Server 120 may include components as depicted and described in detail with respect to cloud computing node 10, as described in reference to FIG. 6, in accordance with at least one embodiment of the present invention. Server 120 may include components, as depicted and described in detail with respect to computing device 500 of FIG. 5, in accordance with at least one embodiment of the present invention.

In an embodiment, server 120 includes custom thumbnail program 101, which further includes speech-to-text module 122, natural language processing module 124, style generator module 126. In an embodiment, custom thumbnail program 101 may be configured to access various data sources, such as thumbnail style database 132 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, custom thumbnail program 101 enables the authorized and secure processing of personal data. In an embodiment, custom thumbnail program provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, custom thumbnail program 101 provides information regarding personal data and the nature (e.g., type, scope, purpose, duration, etc.) of the processing. In an embodiment, custom thumbnail program 101 provides a user with copies of stored personal data. In an embodiment, custom thumbnail program 101 allows for the correction or completion of incorrect or incomplete personal data. In an embodiment, custom thumbnail program 101 allows for the immediate deletion of personal data.

In an embodiment, speech-to-text module 122 is a component or sub-program of custom thumbnail program 101 that converts speech into text. For example, speech-to-text module 122 converts audio of a podcast to text in real time using one or more speech-to-text systems generally known in the art. One of ordinary skill in the art will appreciate that custom thumbnail program 101 can convert any audio data to text. In an embodiment, the text is converted into a Unicode format (i.e., a universal encoding standard used for representing text for computer processing). In an embodiment, the text is converted into a speech synthesis mark-up language (SSML) format. In an embodiment, the raw text containing symbols (e.g., numbers and abbreviations) is converted into the equivalent of written-out words through text normalization (i.e., pre-processing or tokenization).

In an embodiment, natural language processing module 124 is a component or sub-program of custom thumbnail program 101 that identifies and analyzes audio data converted to text. In an embodiment, natural language processing module 124 analyzes the text to identify a particular theme, step, activity, or topic. For example, if the audio says "I think sports team A will win the championship game" speech-to-text module 122 converts the audio to text and then natural language processing module 124 analyzes the text to determine that the theme is sports, and the particular topic is championship game.

In an embodiment, style generator module 126 is a component or sub-program of custom thumbnail program 101 that generates personalized custom thumbnails based on personal user preferences, as well as the emotion, speed, and loudness of the audio data. For example, if the audio says "the girl lost her dog," style generator module 126 analyzes the audio to determine an emotion of "sadness." In another example, style generator module 126 analyzes the speed the speaker is speaking in the audio to determine that the speaker is speaking fast or energetically.

In various embodiments, storage device 130 is a secure data repository for persistently storing thumbnail style database 132 utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 comprises thumbnail style database 132. In an embodiment, thumbnail style database 132 contains information on audio for a podcast, movie, audio clip, or other audio. For example, thumbnail style database 132 contains information on the text for the audio from a podcast. In an embodiment, thumbnail style database 132 contains sample images.

In an embodiment, thumbnail style database 132 contains information of user input. In an embodiment, user input comprises a user's preferences for different colors that correspond to particular emotions associated with an audio segment. For example, user A designates that the color blue should correspond with the emotion "sad" and the color orange should correspond with the emotion "happy." In an embodiment, custom thumbnail program 101 generates a customized thumbnail for a given audio segment or audio file that incorporates one or more colors corresponding to one or more identified emotions associated with the audio data. In an embodiment without user preferences, default colors corresponding to emotions are stored in thumbnail style database 132. For example, the default colors corresponding to emotions designates that the color black should correspond with the emotion "sad" and the color yellow should correspond with the emotion "excited." In an embodiment, custom thumbnail program 101 generates a customized thumbnail for a given audio segment or audio file that incorporates the one or more default colors corresponding to one or more identified emotions associated with the audio data. In an embodiment, user input comprises a user's preferences for brightness of the thumbnail which corresponds to the speed of the words in the audio. For example, user A designates that a fast speed of the speech in the audio corresponds with a high brightness or brightness of the customized thumbnail above a predetermined threshold. Further, user A designates that a slower speed of speech in the audio corresponds with a low brightness or brightness of the customized thumbnail below a predetermined threshold. In an embodiment, user input comprises a user's preferences for loudness of the audio corresponding to a contrast of the thumbnail picture. For example, user A designates that an audio decibel level over 20 db with a contrast of −20% or lower on the customized thumbnail. For example, user A designates decibel level over 60 db in the audio with a contrast of 40% or more segments of the customized thumbnail. In an embodiment without user preferences, default colors, brightness, and speed of audio corresponding to emotions, contrast, colors, and brightness are stored in thumbnail style database 132.

In an embodiment, historical user selections are stored in thumbnail style database 132. In an embodiment, custom thumbnail program 101 determines one or more image attributes such as color, brightness, contrast, or emotion to be applied to an initial thumbnail image to generate a customized thumbnail image based on one or more historical user selections. In an embodiment, custom thumbnail program 101 determines a user typically chooses certain attributes for certain audio content. For example, custom thumbnail program 101 learns and automatically determines one or more attributes to select based on one or more audio characteristics in order to generate a customized thumbnail image. For example, custom thumbnail program 101 determines that a user historically designates color "blue" to correspond to the emotion "sad." In this example, custom thumbnail program 101 accesses the users historical selections in thumbnail style database 132 to customize a thumbnail image corresponding to an audio file with blue coloring if it is determined that the audio file has a "sad" context.

In an embodiment, custom thumbnail program 101 receives multimedia input data. In an embodiment, the multimedia input data can be image data, audio data, such as a podcast, video data, or any combination thereof. In an embodiment, custom thumbnail program 101 converts the audio input into text. In an embodiment custom thumbnail program 101 analyzes the text to identify a context associated with the audio data, such as a particular theme, step, activity, or topic. In an embodiment, custom thumbnail program 101 determines one or more summaries from the text. Audio or video contextually content is automatically determined by analyzing information in the audio signal (e.g., pitch and pause information), information on points of transition, and information about access patterns of previous users. For example, custom thumbnail program 101 determines the context for the first five minutes of a podcast is the speakers background and credentials. In an embodiment, custom thumbnail program 101 determines the speed of the speech audio. In an embodiment, custom thumbnail program 101 determines the time between spoken words to determine the speed of the audio. For example, if the average time between one or more words is above a predetermined threshold, the speed of the audio is determined high.

In an embodiment, custom thumbnail program 101 determines one or more contexts for a particular audio segment. In an embodiment, custom thumbnail program 101 splits the audio into one or more segments. In an embodiment, custom thumbnail program 101 determines an emotion for each segment based, at least in part, on the context associated with a particular section. For example, if the context associated with an audio segment is a lost dog, custom thumbnail program 101 determines the emotion of the segment to be "sad."

in an embodiment, custom thumbnail program 101 segments the audio into one or more segments based on a predetermined amount of time or sections. For example, custom thumbnail program 101 segments the audio into 5-minute segments. Meaning, a 10-minute audio will have two segments. In another example, custom thumbnail program 101 segments an audio into 5 segments. Therefore, a 10 minute audio will have five 2 minute segments.

In an embodiment, custom thumbnail program 101 receives user preferences. In an embodiment, the user preferences include the users correlation between one or more attributes such as color, brightness, contrast, style, etc. for generating a customized thumbnail image and one or more audio characteristics such as emotion, loudness, contrast, or speed of speech. In an embodiment, user preferences comprise users color association or correspondence for the customized thumbnail with emotions or topics. For example, the color blue is designated to topics on the ocean and the color green is designated to topics on the rainforest. Custom thumbnail program 101 generates a customized thumbnail incorporating the color green when the audio content topic is animals in the rainforest. In an embodiment, user preference comprises brightness and contrast ranges or levels. For example, user preference comprises a brightness level of 20-40% to correspond to "sad" or "angry" and a contrast level of 20-30% to correspond to "happy". In an embodiment, user preferences comprise speed ranges. For example, a user indicates a quicker average talking speed corresponds to a higher brightness. In another example, a user indicates a lower average talking speed corresponds to a lower brightness.

In an embodiment, the speed of the speech in the audio corresponds to level of brightness of a customized thumbnail. In an embodiment, the brightness of a customized thumbnail is altered based on the detected rate or speed of audio. In an embodiment, the detected rate or speed of the audio is determined based on the time between spoken words. For example, if the average time between spoken words is above a predetermined threshold, the speed of the audio is determined to be fast. In an embodiment, the loudness of the audio corresponds to level of contrast of customized thumbnail. In an embodiment, the contrast of customized thumbnail is altered based on detected loudness.

In an embodiment, custom thumbnail program 101 selects a sample image based, at least in part, on one or more contexts associated with a particular audio segment. For example, if custom thumbnail program 101 determines the context of a podcast is on avocado tree farms, custom thumbnail program 101 selects a sample image of an avocado. In an embodiment, custom thumbnail program 101 selects two or more sample images based, at least in part, on one or more contexts associated with a particular audio segment. In an embodiment, custom thumbnail program 101 presents the two or more sample images to the user and requests the user to select their preferred sample image. In an embodiment, the user selects a sample image as the initial thumbnail image. For example, the user selects from a predetermined set of images a sample image as the initial thumbnail image. In an embodiment, the user uploads a sample image as the initial thumbnail image. For example, the user uploads an image as a sample image for the initial thumbnail image.

In an embodiment, custom thumbnail program 101 generates a style reference image based off of the summaries and user preferences. In an embodiment, custom thumbnail program 101 performs a neural style transfer of the sample image, based at least in part, on one or more of the user preferences, and the determined emotions and summaries of the audio. In an embodiment, custom thumbnail program 101 blends the sample image and style reference image together to create an output image of the custom thumbnail.

In an example, custom thumbnail program 101 determines the summary of an audio book is about a couple living near a beach. Custom thumbnail program 101 selects a sample image of two chairs on a beach. In this example, custom thumbnail program 101 determines 3 sections based on one or more summaries. The first section from time start to 15 minutes, the second section from 16 minutes to 45 minutes, and the third section from 46 minutes to one hour. Custom thumbnail program 101 further determines the emotions of each section based on the summaries to be the first section "happy," second section "angry," and third section "sad." Custom thumbnail program 101 determines the user preferences, and determines the user associates the emotion "happy" with orange, "angry" with red, and "sad" with blue. Custom thumbnail program 101 divides the sample image into three sections and performs neural image transfer with the first section orange, second section red, and third section blue. In an embodiment, the order of sections are in timeline order of the audio from left to right. In this example, the first section comprises the far left side of the sample image, the second section comprises the middle of the sample image, and the third section comprises the right side of the sample image.

Figure 2:
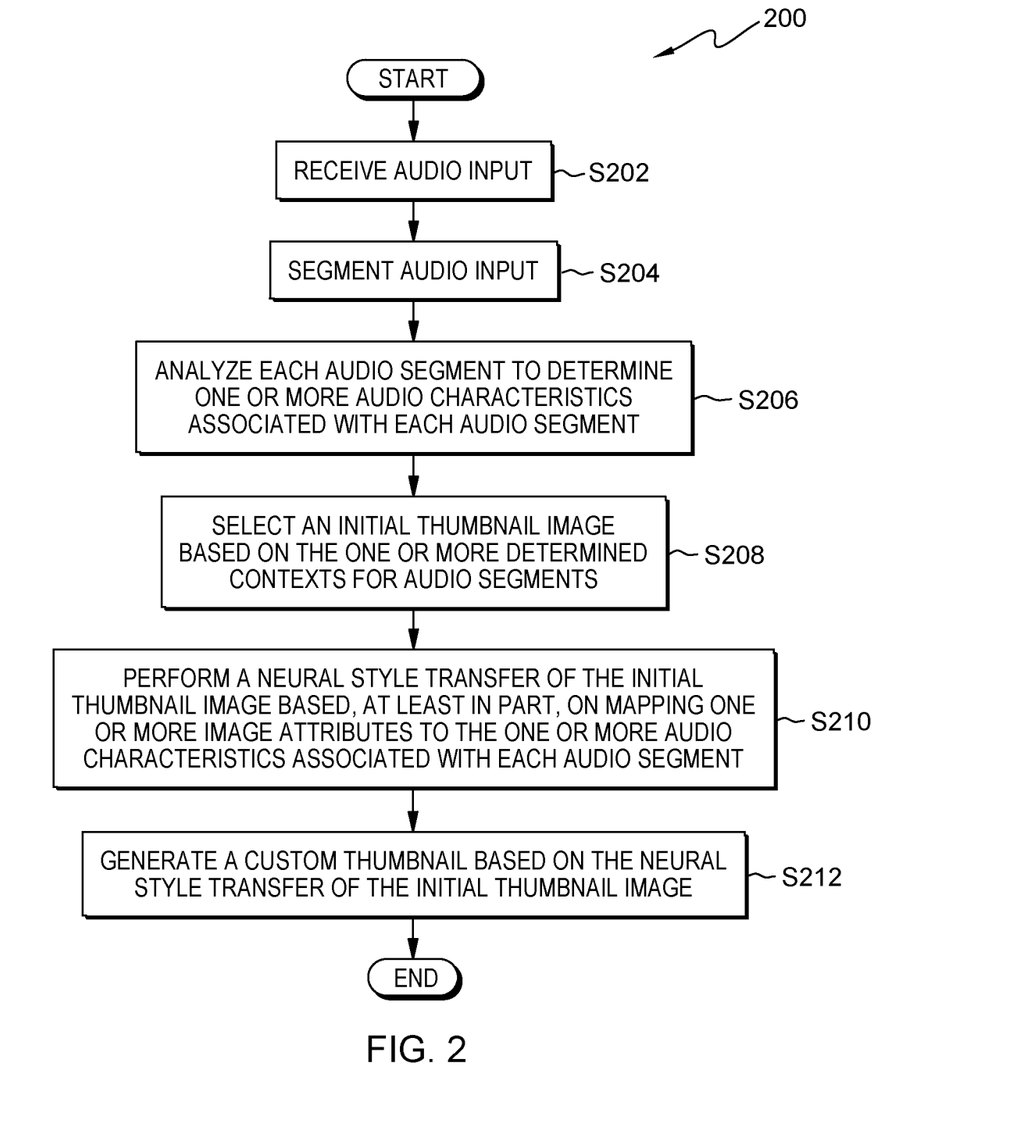
FIG. 2 is a flow chart diagram depicting operational steps for a custom thumbnail program 101, generally designated 200, in accordance with at least one embodiment of the present invention.

FIG. 2 is a flow chart diagram depicting operational steps for generating a custom thumbnail, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, custom thumbnail program 101 receives audio input. In an embodiment, the audio input comprises a podcast, audio book, video, or any audio content.

At step S204, custom thumbnail program 101 segments the audio input. In an embodiment, custom thumbnail program 101 segments the audio input into one or more audio segments based on a predetermined length of time. For example, if an audio file is one hour long, the audio file is segmented into six ten minute segments. In an embodiment, custom thumbnail program 101 segments the audio input into one or more audio segments based on changes in the context of the audio. For example, if an audio file is thirty minutes long, a first context associated with the first 15 minutes of the audio is identified and then a second context associated with the last 15 minutes of the audio is identified, the audio file is segments into two fifteen minute audio segments.

At step S206, custom thumbnail program 101 analyzes each audio segment to determine one or more audio characteristics associated with each audio segment.

At step S208, custom thumbnail program 101 selects an initial thumbnail image based on the one or more determined contexts for audio segments. For example, custom thumbnail program 101 selects an initial image based, at least in part, on one or more determined summaries associated with the audio segments.

At step S210, custom thumbnail program 101 performs a neural style transfer of the initial thumbnail image based, at least in part, on mapping one or more image attributes to the one or more audio characteristics associated with each audio segment.

At step S212, custom thumbnail program 101 generates a custom thumbnail based on the neural style transfer of the initial thumbnail image.

Figure 3:
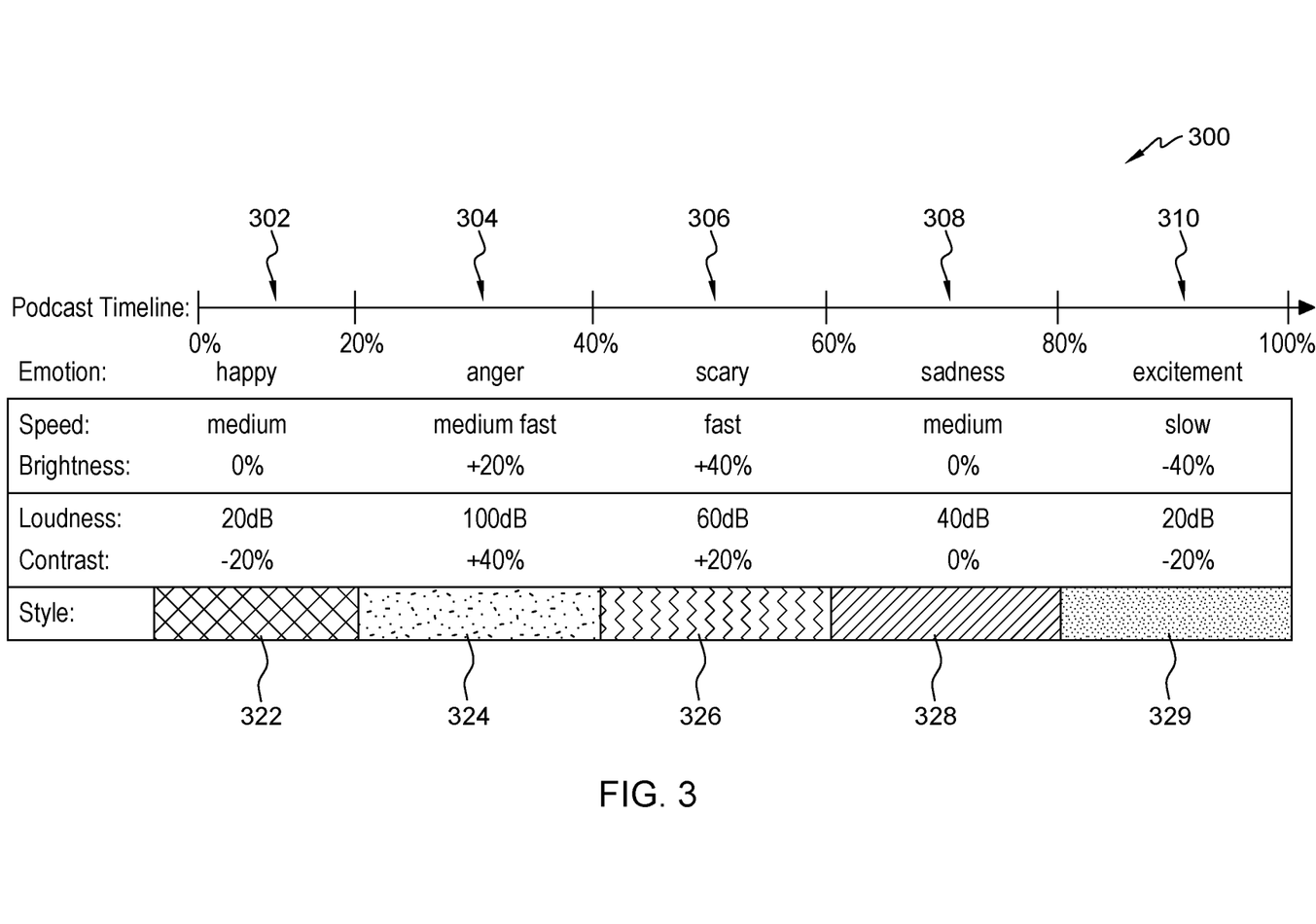
FIG. 3 depicts a style generator timeline corresponding to content associated with an audio stream, generally designated 300, in accordance with at least one embodiment of the present invention.

FIG. 3 is a timeline depicting a digital audio timeline, generally designated 300, in accordance with at least one embodiment of the present invention.

In an embodiment, custom thumbnail program 101 receives an audio input, such as a podcast. In an embodiment, custom thumbnail program 101 converts the audio input to text and analyzes the text to determine one or more context or topics. In an embodiment, custom thumbnail program 101 segments the audio input into audio segments based, at least in part, on the context of the audio input. In FIG. 3, custom thumbnail program 101 segments the audio input into sections 302, 304, 306, 308, and 310. In FIG. 3, section 302 is from time 0%-20%, section 304 is from time 20%-40%, section 306 is from time 40%-60%, section 308 is from time 60%-80%, and section 310 is from time 80%400%. Custom thumbnail program 101 determines the emotion for each segment based, at least in part, on the context, topic, words, or discussion from the audio input. Custom thumbnail program 101 determines section 302 is of emotion "happy" with medium speed and a loudness of 20 dB. Custom thumbnail program 101 determines from user preferences for the users preferences for associating speed and brightness and loudness and contrast. Here, user preferences indicate a faster average speed of talking (e.g., "speed") is associated with a higher brightness and a louder average volume (e.g., "loudness") is associated with a higher contrast.

Here, the user associates a medium speed with 0% brightness and a loudness of 20 dB with a contrast of −20%. Custom thumbnail program 101 further determines section 304 is of emotion "anger" with medium fast speed and a loudness of 100 dB. Here, the user associates a medium fast speed with +20% brightness and a loudness of 100 dB with a contrast of +40%. Custom thumbnail program 101 further determines section 306 is of emotion "scary" with fast speed and a loudness of 60 dB. Here, the user associates a fast speed with +40% brightness and a loudness of 60 dB with a contrast of +20%. Custom thumbnail program 101 further determines section 308 is of emotion "sadness" with medium speed and a loudness of 40 dB. Here, the user associates a medium speed with 0% brightness and a loudness of 40 dB with a contrast of 0%. Custom thumbnail program 101 further determines section 310 is of emotion "excitement" with slow speed and a loudness of −40 dB. Here, the user associates a slow speed with −40% brightness and a loudness of 20 dB with a contrast of −20%.

Custom thumbnail program 101 determines a color or style associated with each segment based, at least in part on the determined emotion, speed, brightness, loudness, or contrast. As depicted in FIG. 3, each segment (322, 324, 326, 328, and 329) have a different style depicted as lines and dots. In other embodiments, the style comprises one or more colors.

Figure 4:
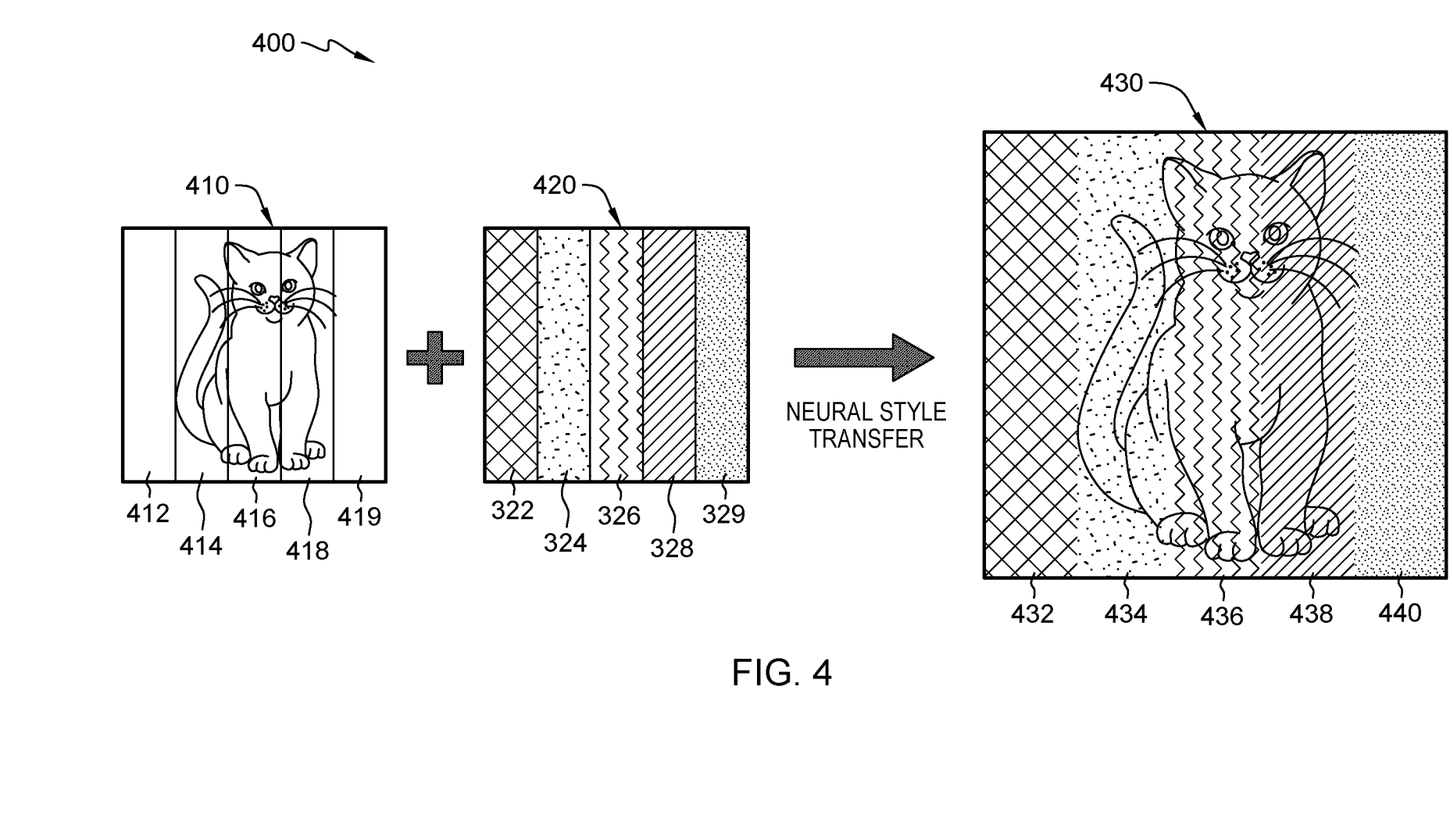
FIG. 4 depicts an exemplary personalized thumbnail, generally designated 400, generated based on the style generator timeline of FIG. 3, in accordance with at least one embodiment of the present invention.

FIG. 4 is a diagram depicting an exemplary thumbnail, generally designated 400, in accordance with at least one embodiment of the present invention. FIG. 4 indicates an initial thumbnail image 410 and the style reference image 420. FIG. 4 exemplifies custom thumbnail program 101 blending the initial thumbnail image and style reference image together to create a customized thumbnail image that looks like the content image, but "painted" in the style of the style reference image to create custom thumbnail 430.

Segment style 322 from FIG. 3 corresponds to style reference image section 322 exemplified in FIG. 4. Further, segment style 324 from FIG. 3 corresponds to style reference image section 324 in FIG. 4, segment style 326 corresponds to style reference image section 326, segment style 328 corresponds to style reference image section 328, and segment style 329 corresponds to style reference image section 329.

Custom thumbnail program 101 performs a neural style transfer on section 412 from sample image 410 and section 322 from style reference image 420 to create section 432 in custom thumbnail 430. Custom thumbnail program 101 continues the process of neural style transfer for section 414 from sample image 410 and section 324 from style reference image 420 to create section 434 in custom thumbnail 430. Custom thumbnail program 101 further performs a neural style transfer for section 416 from sample image 410 and section 326 from style reference image 420 to create section 436 in custom thumbnail 430. Custom thumbnail program 101 further performs a neural style transfer for section 418 from sample image 410 and section 328 from style reference image 420 to create section 438 in custom thumbnail 430. Custom thumbnail program 101 further performs a neural style transfer for section 419 from sample image 410 and section 329 from style reference image 420 to create section 440 in custom thumbnail 430.

FIG. 5 is a block diagram depicting components of a computing device, generally designated 500, suitable for custom thumbnail program 101 in accordance with at least one embodiment of the invention. Computing device 500 includes one or more processor(s) 504 (including one or more computer processors), communications fabric 502, memory 506 including, RAM 516 and cache 518, persistent storage 508, which further includes custom thumbnail program 101, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile computer readable storage media.

Program instructions for custom thumbnail program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
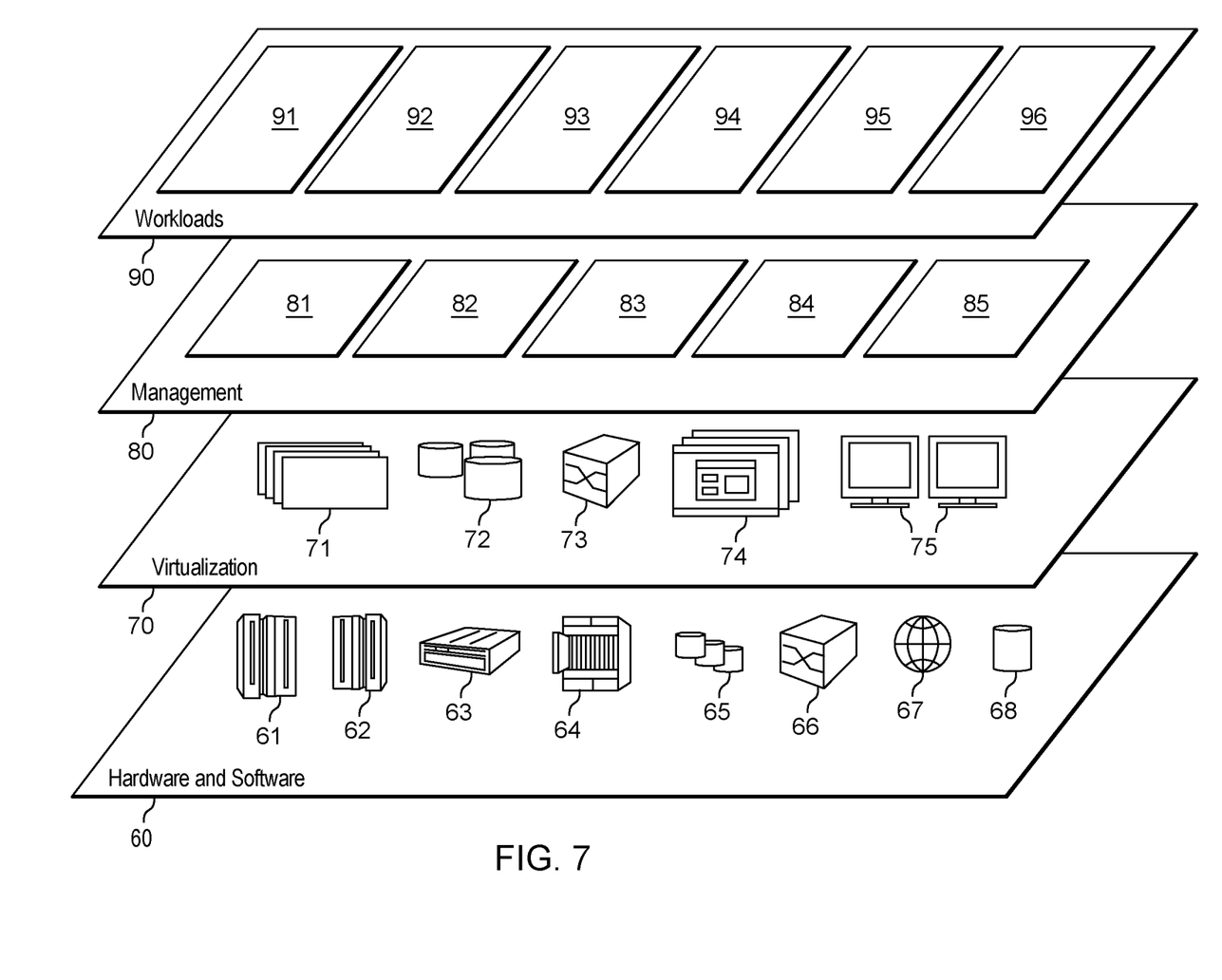
FIG. 7 is block diagram depicting a set of functional abstraction model layers provided by cloud computing environment 50 depicted in FIG. 6 in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and custom thumbnail generation 96.

What is claimed is:

1. A computer-implemented method, the computer-implemented method comprising:
    segmenting an audio file into audio segments;
    detecting, based on data extracted from the audio segments, respective contexts associated with each of the audio segments;
    selecting an initial thumbnail image based, at least in part, on one or more of the respective contexts associated with the audio segments; and
    generating a customized thumbnail image, wherein generating the customized thumbnail comprises:
        selecting, from a thumbnail style database and based on the respective contexts, image styles respectively corresponding to the audio segments;
        segmenting the initial thumbnail image into image segments respectively corresponding to the audio segments; and
        performing a neural style transfer of the image styles onto the image segments respectively corresponding to a same audio segment from the audio segments.

2. The computer-implemented method of claim 1, wherein segmenting the audio file into the audio segments comprises detecting a change from a first context to a second context in the audio file.

3. The computer-implemented method of claim 1, wherein selecting the image styles comprises identifying a color, a brightness level, and a contrast level corresponding to a context from the respective contexts.

4. The computer-implemented method of claim 3, wherein the color, the brightness level, and the contrast level correspond to a type of emotion, a speed, and a loudness associated with the context.

5. The computer-implemented method of claim 4, wherein the color, the brightness level, and the contrast level are associated with the type of emotion, the speed, and the loudness based on user input.

6. The computer-implemented method of claim 4, wherein the color, the brightness level, and the contrast level are associated with the type of emotion, the speed, and the loudness based on preferences learned over time for a particular user.

7. A computer program product, the computer program product comprising one or more computer readable storage media and program instructions stored on the one or more computer readable storage media, the program instructions including instructions to:
    segment an audio file into audio segments;
    detect, based on data extracted from the audio segments, respective contexts associated with each of the audio segments;
    select an initial thumbnail image based, at least in part, on one or more of the respective contexts associated with the audio segments; and
    generate a customized thumbnail image, wherein generating the customized thumbnail comprises:
        selecting, from a thumbnail style database and based on the respective contexts, image styles respectively corresponding to the audio segments;
        segmenting the initial thumbnail image into image segments respectively corresponding to the audio segments; and
        performing a neural style transfer of the image styles onto the image segments respectively corresponding to a same audio segment from the audio segments.

8. The computer program product of claim 7, wherein the instructions to segment the audio file into the audio segments comprises detecting a change from a first context to a second context in the audio file.

9. The computer program product of claim 7, wherein selecting the image styles comprises identifying a color, a brightness level, and a contrast level corresponding to a context from the respective contexts.

10. The computer program product of claim 9, wherein the color, the brightness level, and the contrast level correspond to a type of emotion, a speed, and a loudness associated with the context.

11. The computer program product of claim 10, wherein the color, the brightness level, and the contrast level are associated with the type of emotion, the speed, and the loudness based on user input.

12. The computer program product of claim 10, wherein the color, the brightness level, and the contrast level are associated with the type of emotion, the speed, and the loudness based on preferences learned over time for a particular user.

13. A computer system, comprising:
    one or more computer processors;
    one or more computer readable storage media; and
    computer program instructions stored on the one or more computer readable storage media for execution by the one or more computer processors the computer program instructions including instructions to:
        segment an audio file into audio segments;
        detect, based on data extracted from the audio segments, respective contexts associated with each of the audio segments;
        select an initial thumbnail image based, at least in part, on one or more of the respective contexts associated with the audio segments; and
        generate a customized thumbnail image, wherein generating the customized thumbnail comprises:
            selecting, from a thumbnail style database and based on the respective contexts, image styles respectively corresponding to the audio segments;
            segmenting the initial thumbnail image into image segments respectively corresponding to the audio segments; and
            performing a neural style transfer of the image styles onto the image segments respectively corresponding to a same audio segment from the audio segments.

14. The computer system of claim 13, wherein the instructions to segment the audio file into the audio segments comprises identifying a change from a first context to a second context in of the audio file.

15. The computer system of claim 13, wherein selecting the image styles comprises identifying a color, a brightness level, and a contrast level corresponding to a context from the respective contexts.

16. The computer system of claim 15, wherein the color, the brightness level, and the contrast level correspond to a type of emotion, a speed, and a loudness associated with the context.

17. The computer system of claim 16, wherein the color, the brightness level, and the contrast level are associated with the type of emotion, the speed, and the loudness based on user input.

18. The computer-implemented method of claim 1, wherein the data extracted from the audio segments comprises text data converted from speech in an audio segment.

19. The computer-implemented method of claim 1, wherein the thumbnail style database comprises a set of image styles mapped to a set of contexts based on user preferences.

20. The computer-implemented method of claim 1, wherein segmenting the audio file comprises segmenting the audio segments based on predetermined lengths.

\* \* \* \* \*